United States Patent [19]

Ishida

[11] Patent Number: 4,712,525
[45] Date of Patent: Dec. 15, 1987

[54] COMBUSTION CHAMBER OF INTERNAL COMBUSTION ENGINE

[75] Inventor: Shiro Ishida, Fujisawa, Japan

[73] Assignee: Isuzu Motors Limited, Tokyo, Japan

[21] Appl. No.: 935,357

[22] Filed: Nov. 26, 1986

[30] Foreign Application Priority Data

Nov. 30, 1985 [JP] Japan ................... 60-270288

[51] Int. Cl.⁴ .................. F22B 15/00; F22B 21/30
[52] U.S. Cl. .................... 123/263; 123/276; 123/145 A
[58] Field of Search ............ 123/263, 276, 275, 640, 123/143 A, 143 B, 145 A, 274, 279, 281, 283, 142.5 R, 536, 298

[56] References Cited

U.S. PATENT DOCUMENTS

| 4,124,003 | 11/1978 | Aba et al. | 123/536 |
| 4,170,212 | 10/1979 | Mori et al. | 123/145 A |
| 4,202,312 | 5/1980 | Mori et al. | 123/145 A |
| 4,676,208 | 6/1987 | Moser et al. | 123/276 |
| 4,676,210 | 6/1987 | Moser et al. | 123/276 |

Primary Examiner—Raymond A. Nelli
Attorney, Agent, or Firm—Cullen, Sloman, Cantor, Grauer, Scott & Rutherford

[57] ABSTRACT

According to the present invention there is provided a combustion chamber of an internal combustion engine constructed so that, in order to effect good combustion of fuel fed in atomized condition into a combustion chamber with a swirl formed therein, first the vaporization of the fuel fed in atomized condition is accelerated and then the thus-vaporized fuel is ignited.

6 Claims, 5 Drawing Figures

COMBUSTION CHAMBER OF INTERNAL COMBUSTION ENGINE

BACKGROUND OF THE INVENTION

1. Field of the Invention

The present invention relates to a combustion chamber of an internal combustion engine of the type in which fuel oil is injected directly into the combustion chamber. More particularly, it is concerned with a combustion chamber of an internal combustion engine which permits the use of volatile fuels of low cetane number such as gasoline and alcohol.

2. Description of the Prior Art

Generally, a known technique which permits the use of coarse fuels, e.g. methanol (methyl alcohol), is described in Japanese Utility Model Laid Open No. 107820/1982. According to this proposed construction, as shown in FIG. 5 of the accompanying drawings hereof, a precombustion chamber (b) is provided laterally at the top of a cylinder (a), a preheating plug (d) is disposed obliquely in a bottom wall portion (c) of the precombustion chamber (b), further a fuel injection valve (e) is disposed opposite the preheating plug (d), and a spark plug (f) is disposed between the fuel injection valve (e) and the preheating plug (d).

In the above described construction, a glow plug is used to raise the temperature in the precombustion chamber to ignite the burn fuel in order to improve the engine start-up characteristic and drivability under a low load condition.

However, since the precombustion chamber (b) of the cylinder (a) is in communication with a main combustion chamber (g) of a piston (i) through a throat (h), a throttle loss at the time of introducing compressed air into the preheating chamber (b) and a heat loss at the time of flowing of combustion gas from the precombustion chamber (b) into the main combustion chamber (g) are large, thus causing deterioration of the thermal efficiency.

Such deterioration of the thermal efficiency results in a reduction of fuel combustion in the combustion chamber, and a corresponding lowering of output and the formation of unburnt material such as HC. Further, at the time of start-up at a low outside air temperatures of $-20°$ C. or lower, it is necessary to take countermeasures such as enhancing the heat generating ability of the glow plug to an extreme degree or prolonging the heating time in order to permit ignition with the spark plug and combustion without misfire because the fuel oil injected is methanol which is poor in volatility and also because the amount of fuel oil is increased at the time of the start-up of the engine. This is undesirable from the standpoint of battery capacity and start-up time.

SUMMARY OF THE INVENTION

The present invention overcomes the above-mentioned various problems, and it is the object thereof to provide a combustion chamber of an internal combustion engine highly capable of burning volatile fuels of low cetane number such as alcohol and gasoline under all load conditions including low temperature start-up.

The above object is attained by the following construction. In the combustion chamber with a swirl formed therein there are provided a glow plug means and a spark plug means disposed in positions close to each other along the direction of flow of the swirl, and a fuel injecting nozzle means for injecting atomized fuel toward the vicinity of the heat generating portion of the glow plug means.

In operation, upon injection of atomized fuel from the fuel injecting nozzle means, the atomized fuel is vaporized in an accelerated manner by an air current of high temperature created by the heat generating portion of the glow plug means. Then, the vaporized fuel mist is allowed to flow to a discharge portion of the spark plug means while mixing with air, and when discharge occurs at the discharge portion upon arrival of the vaporized fuel mist-air mixture at the discharge portion, ignition occurs in an instant and combustion is effected in a satisfactory manner.

DESCRIPTION OF PREFERRED EMBODIMENTS

First Embodiment

The following description relates to a combustion chamber of an internal combustion engine according to a first embodiment of the present invention with reference to the accompanying drawings.

Figure 1:
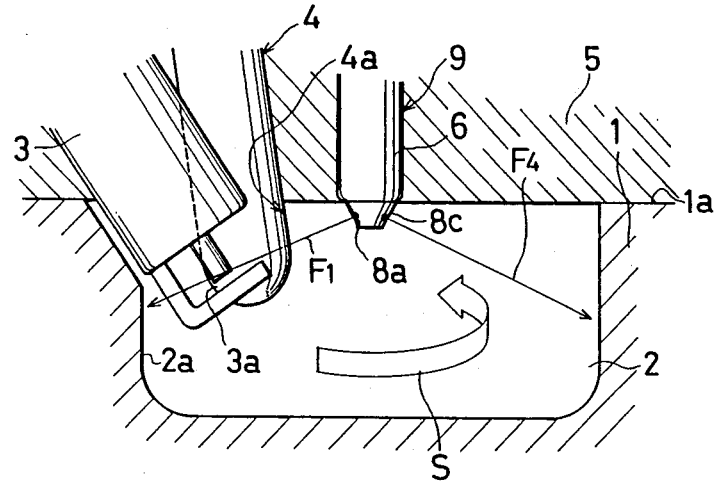
FIG. 1 is a schematic longitudinal sectional view of a combustion chamber of an internal combustion engine according to a first embodiment of the present invention.
Figure 2:
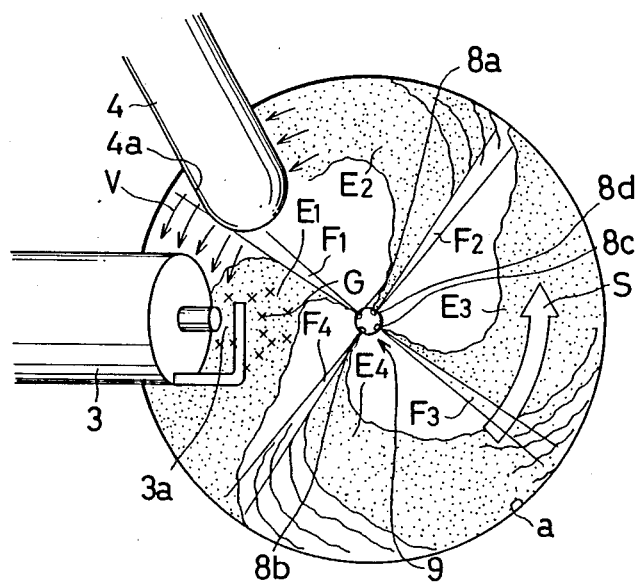
FIG. 2 is a plan view of FIG. 1.

In FIG. 1, the reference numeral 1 denotes a piston top; numeral 2 denotes a combustion chamber formed by deeply recessing the piston top 1 axially downwardly with respect to a top surface 1a; and numeral 5 denotes a cylinder head.

Into the combustion chamber 2 there is supplied a rotating current of intake air from a swirl port (not shown). For this rotating current the combustion chamber 2 is formed generally circularly in its transverse section perpendicular to the axis of the piston 1, so that such rotating current becomes a swirl S flowing along an inner peripheral wall 2a of the combustion chamber.

The combustion chamber of the internal combustion engine of the present invention is unique in that volatile fuels of low cetane number can be burnt well without misfire even during start-up of the engine at a low temperature.

To realize the above unique characteristic, a fuel injecting nozzle means for supplying atomized fuel into the combustion chamber 2, a spark plug means employed as an ignition accelerating means, and a glow plug means, are constructed and arranged as follows.

A spark plug means 3 is integrally fixed into the cylinder head 5 so that a discharge portion 3a thereof is positioned near the inner peripheral wall 2a of the combustion chamber 2 when the piston 1 is about to terminate its compression stroke.

Also fixed integrally into a cylinder head 5 is a glow plug means 4 in a position in which a heat generating portion 4a thereof is located near the inner peripheral wall 2a of the combustion chamber 2 when the piston 1 is about to terminate its compression stroke.

The glow plug means 4 is disposed so that the heat generating portion 4a thereof is positioned on an upstream side of the swirl S and in the vicinity of the discharge portion 3a of the spark plug means 3.

Figure 3:
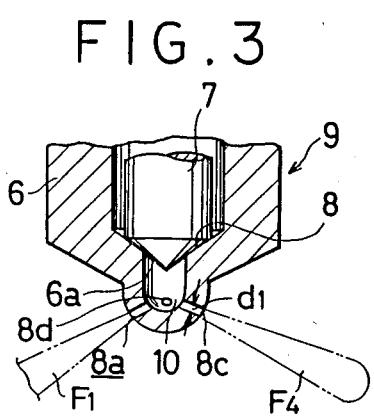
FIG. 3 is a partial sectional view of a fuel injecting nozzle means.

In this embodiment, as a fuel injecting nozzle means 9 there is provided a structure as shown in FIG. 3. As illustrated in this figure, a needle valve 7 is disposed vertically movable within a cylindrical nozzle body 6. On a front end side of the nozzle body 6 there is formed a valve seat 8 for a seat portion 6a of the needle valve 7. In the portion of the nozzle body 6, closer to the front end thereof than the valve seat 8, there is formed a fuel injection chamber 10 which is brought into communication with a fuel chamber (not shown) in the nozzle body 6 when the seat portion 6a is spaced apart from the valve seat 8. In the front end portion of the nozzle body 6 which forms the fuel injection chamber 10 there are formed a plurality of nozzle holes 8a, 8b, 8c and 8d in circumferentially spaced relation to each other. A diameter $d_1$ of each of the nozzle holes 8a–8d is set so that the atomized fuel mist injected from the nozzle holes has an appropriate penetrating force for the swirl S in the combustion chamber 2 and has an appropriate spread for the combustion chamber 2.

The fuel injecting nozzle means 9 thus constructed is integrally fixed in the cylinder head 5 so that it is positioned approximately centrally relative to the combustion chamber 2, and the nozzle holes 8b–8d face the inner wall 2a of the combustion chamber 2 when the piston 1 is about to terminate its compression stroke.

In this embodiment, the number of the nozzle holes is four, and the direction of opening of one of the nozzle holes 8a–8d, for example the nozzle hole 8a, is such that fuel mist $F_1$ can be fed toward the flow plug means 4 or thereabouts.

The operation of the first embodiment will now be described. When the needle valve 7 of the fuel injecting nozzle means 9 is lifted in the direction of opening the nozzle holes 8a–8d, fuel such as alcohol or gasoline is fed in atomized condition into the combustion chamber 2 from the nozzle holes.

At the time of start-up of the engine at low temperature, the glow plug means 4 is energized to heat the heat generating portion 4a until it is "red hot", so a high-temperature air current V is created locally downstream of the swirl near the heat generating portion 4a of the glow plug means 4. The fuel mist $F_1$ impinging on the heat generating portion 4a of the glow plug means 4 after atomized injection from the nozzle hole 8a is finely pulverized by the injection and at the same time it is vaporized in an instant by a high-temperature heat of the heat generating portion 4a, which vapor is allowed to flow to the downstream side of the swirl S. At this time, the vaporization of the fuel mist $F_1$ which has been fed in an atomized condition is accelerated by the high-temperature air is current V to form a fuel vapor layer which is easy to ignite and burn, in the vicinity of the discharge portion 3a of the spark plug means 3. Upon ignition of the spark plug means 3, this fuel vapor layer, indicated by $E_1$, ignites to form an extremely large group of flames G. Fuel mists $F_x$–$F_4$ fed in an atomized condition from the other nozzle holes 8b–8d at the same time as the fuel mist $F_1$ impinge upon the inner wall 2a of the combustion chamber 1 and are thereby pulverized finely, then evaporated to a moderate extent while being allowed to flow to the downstream side of the swirl S along the inner wall 2a of the combustion chamber. As a result, fuel vapor layers $E_2$–$E_4$ are formed, and consequently the flame group G is propogated successively to the circumferentially adjacent fuel vapor layers $E_2$–$E_4$, whereby a complete combustion in the combustion chamber 2 is attained.

The glow plug means 4 can be heated even when the engine load is low and the mixture is lean, and by the heating thereof there is formed the strong flame group G mentioned above. As a result, a more stable combustion is ensured under all load conditions.

Second Embodiment

A combustion chamber of an internal combustion engine according to a second embodiment of the present invention will now be described with reference to the accompanying drawings.

Figure 4:
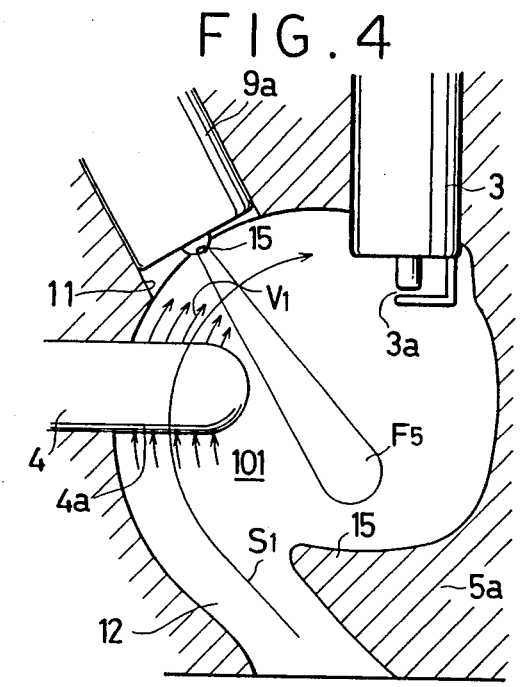
FIG. 4 is a schematic longitudinal sectional view of a combustion chamber of an internal combustion engine according to a second embodiment of the present invention.
Figure 5:
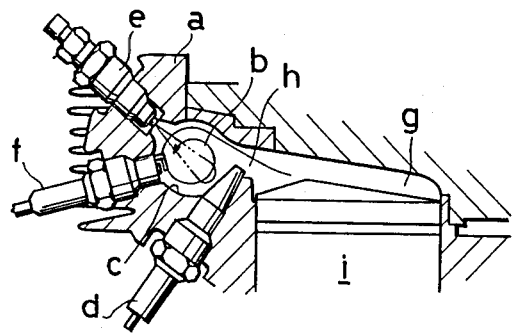
FIG. 5 is a schematic sectional view of a conventional combustion chamber.

As shown in FIG. 4, a hemispherical swirl combustion chamber 101 is formed within a cylinder head 5a, and a passage 11 which is in communication with the interior of the swirl combustion chamber 101 is formed above the same chamber. A fuel injecting nozzle means 9a is fixedly fitted in the passage 11 so that a front end portion thereof faces the interior of the swirl combustion chamber 101. The opening direction of the nozzle hole 15 formed in the front end portion of the nozzle means 9a is selected so that atomized fuel mist $F_1$ is injected to a shelf portion 15 of a swirl chamber 12 which forms a swirl $S_1$, in a position downstream of the swirl $S_1$ in the swirl combustion chamber 101. Like the first embodiment, a spark plug means 3 as an ignition means and a glow plug means 4 are provided within the swirl combustion chamber 101. A heat generating portion 4a of the glow plug means 4 is provided which projects into the swirl combustion chamber on a more upstream side of the swirl S than the fuel injecting nozzle means 9a, while a projecting discharge portion 3a of the spark plug means 3 is provided on a more downstream side of the swirl S than the fuel injecting nozzle means 9a. In this embodiment, therefore, compressed air introduced into the swirl combustion chamber 101 is heated to a high temperature by the glow plug means 4 upstream of the swirl $S_1$, and fuel mist $F_5$ which has been fed in atomized condition is vaporized acceleratively by a high-temperature air current $V_1$ created by the said heating. When the fuel mist $F_5$ thus vaporized reaches a position near the discharge portion 3a of the spark plug 3 together with the swirl $S_1$, it is ignited by the discharge portion 3a and thereby burnt.

Consequently, also in this second embodiment, there are attained good low-temperature start-up performance and a stable combustion performance.

What is claimed is:

1. A combustion chamber of an internal combustion engine, comprising:

a combustion chamber with a swirl formed therein;

a fuel injecting nozzle means for feeding fuel in an atomized condition toward an inner wall of said combustion chamber with a swirl formed therein;

a glow plug means for vaporizing the fuel fed in an atomized condition, said glow plug means being disposed on an upstream side of the swirl near the line of injection of the fuel; and a spark plug means for igniting the vaporized fuel, said spark plug means being disposed downstream of the swirl in proximity to said glow plug means.

2. A combustion chamber of an internal combustion engine, comprising:

a combustion chamber with a swirl formed therein, said combustion chamber including a recess in the top of a piston and having a peripheral side wall;

a fuel injecting nozzle means for feeding fuel in atomized condition toward said peripheral side wall;

a glow plug means for vaporizing the fuel fed in atomized condition, said glow plug means being disposed in a cylinder head on the upstream side of the swirl near the line of injection of the fuel; and a spark plug means for igniting the vaporized fuel, said spark plug means being disposed in the cylinder head in a position close to said glow plug means.

3. A combustion chamber of an internal combustion engine according to claim 2, wherein said fuel injecting nozzle means has a plurality of fuel atomizing and feeding nozzle holes at intervals in a circumferential direction, said fuel injecting nozzle means being positioned approximately centrally in said combustion chamber with a swirl formed therein, one of said nozzle holes being positioned so as to feed the atomized fuel upstream of the swirl with respect to said spark plug means in the vicinity of said glow plug means.

4. A combustion chamber of an internal combustion engine according to claim 2, wherein said combustion chamber with a swirl formed therein is circular in its transverse section perpendicular to an axis thereof.

5. A combustion chamber of an internal combustion engine according to claim 3, wherein the transverse section of said combustion chamber perpendicular to the axis thereof is in the form of a polygon.

6. A combustion chamber of an internal combustion engine, including:

a swirl combustion chamber with a swirl formed therein, said swirl combustion chamber being formed in a cylinder head;

a fuel injecting nozzle means for atomizing and feeding fuel to a downstream side of the swirl, said fuel injecting nozzle means facing the interior of said swirl combustion chamber;

a glow plug means for heating compressed air forced into said swirl combustion chamber and vaporizing the fuel fed in atomized condition, said glow plug means being disposed on an upstream side of the swirl with respect to said fuel injecting nozzle means; and a spark plug means for igniting the vaporized fuel, said spark plug means being positioned downstream of the swirl in the vicinity of said fuel injecting nozzle means.

* * * * *